United States Patent
Blytas

[15] 3,658,512
[45] Apr. 25, 1972

[54] METAL EXTRACTION
[72] Inventor: George C. Blytas, Kensington, Calif.
[73] Assignee: Shell Oil Company, New York, N.Y.
[22] Filed: Jan. 15, 1970
[21] Appl. No.: 3,154

[52] U.S. Cl.................................75/103, 75/117, 75/119, 75/120, 75/121, 75/101 BE, 23/312
[51] Int. Cl....................................C22b 15/10, C22b 23/04
[58] Field of Search..................75/101 BE, 101 R, 108, 117, 75/119, 120, 121, 103; 23/50 BE, 312; 260/429 J, 429 BQ

[56] References Cited

UNITED STATES PATENTS

| | | | |
|---|---|---|---|
| 2,993,782 | 7/1961 | Hampton et al. | 75/108 |
| 3,301,660 | 1/1967 | Imamura | 75/20 |
| 3,451,807 | 6/1969 | Scribner et al. | 75/117 |
| 3,532,490 | 10/1970 | Burkin | 75/108 X |

OTHER PUBLICATIONS

Stary et al., Anal. Chim. Acta., Vol 28, pp. 227–235 (1963). QD71.A47

*Primary Examiner*—L. Dewayne Rutledge
*Assistant Examiner*—G. T. Ozaki
*Attorney*—Raymond Owyang and John H. Colvin

[57] ABSTRACT

Selective extractions of copper and cobalt values from alkaline solutions containing ammonium ions employ dialkanoylmethanes as the extracting compound.

9 Claims, 1 Drawing Figure

Patented April 25, 1972
3,658,512
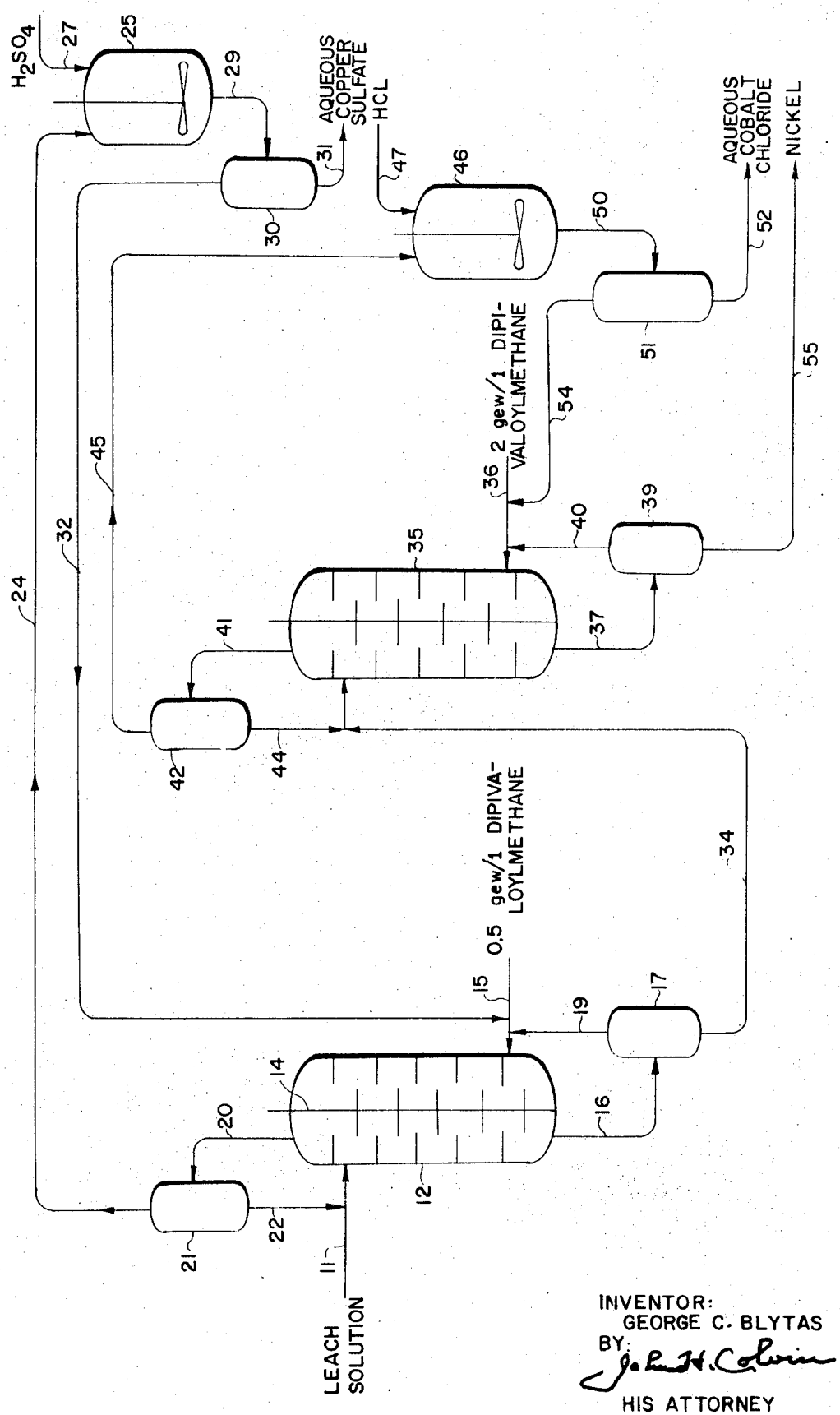
INVENTOR:
GEORGE C. BLYTAS
BY:
John H. Colvin
HIS ATTORNEY

METAL EXTRACTION

BACKGROUND OF THE INVENTION

Copper, cobalt and nickel are valuable metals. One of the methods used to recover these metals (from ores containing them) involves the use of ammonia leach systems. With an ammonia leach, in the absence of special complicated procedures copper, cobalt and nickel values are simultaneously leached from the ore. It is then necessary to separate these copper, cobalt and nickel values, which are often present as sulfates and/or carbonates, from the ammonia leach solution and isolate the individual metal values.

In corresponding acid leach systems, liquid/liquid extraction of all or of individual metal values from the leach solution with an organic phase containing organic-soluble extractants such as organic acids, ketones and alcohols has proven very effective. However, liquid/liquid extraction is generally ineffective and impractical as a means of recovering and separating copper, cobalt and nickel values from an ammonia leach solution. Not only are many of the common extractants, for example organic acids, impractically too soluble in the aqueous alkaline ammonia leach solution (pH—7.5-9.0), but also the presence of ammonium ions in the aqueous leach solution greatly decreases the ability of the common organic extractants to effectively remove metal values from the aqueous solution. In the extraction of, for example, copper II from an alkaline ammonium ion-containing solution with a hypothetical extractant HL there are two competing reactions. In the desired reaction copper II, which is present in solution as an ammonia complex is complexed with extractant HL, i.e., $Cu(NH_3)_x{}^{++} + 2HL \rightleftharpoons CuL_2 + 2NH_4{}^+ + (X-2)NH_3$. The presence of ammonium ions hinders this reaction. The undesired competing reaction, $Cu(NH_3)_x{}^{++} + 2HL \rightleftharpoons Cu(NH_3)_{x-2}{}^{++} + 2NH_4L$ is not hindered by ammonium ion and forms generally water-soluble ammonium salts of the extractant.

The application of commercially attractive liquid/liquid extraction processes to the recovery of copper, cobalt or nickel values from ammonia leach solution therefore depends on providing a compound (or class of compounds) which is generally insoluble in alkaline aqueous media, and which will selectively extract one or more of these three metal values from an alkaline leach solution which additionally contains ammonium ions.

STATEMENT OF THE INVENTION

It has now been found that relatively large proportions of copper values, such as are contained in ammonia leaches of coppper-bearing ores, are selectively extracted from aqueous alkaline, ammonium ion-containing solutions by the use as extractants of non-aqueous water-immiscible solutions of dialkanoylmethanes of from nine to 20 carbon atoms which contain alkanoyl groups that independently are α-branched and of from four to about 13, preferably four to seven, carbon atoms. It has further been found that relatively large proportions of cobalt values are also selectively extracted under different conditions from aqueous alkaline, ammonium ion-containing solutions by the use of non-aqueous, water-immiscible solutions of these dialkanoylmethanes as extractants. In the present process, copper and/or cobalt values are separated by liquid/liquid extraction from an aqueous solution having a pH of from about 7.5 − 9.5 and containing, in addition to the copper and/or cobalt values at least about 0.01 gram equivalent weights per liter of ammonium ions by contacting the solution in liquid phase with an essentially non-aqueous, water-immiscible solution of dialkanoylmethane. The copper and cobalt values are subsequently recovered, if desired, from the resulting extract. Under alkaline, ammoniacal conditions this process effectively separates copper values from nickel values, copper values from zinc values, cobalt values from nickel values and by control of extraction conditions, separates copper values from cobalt values.

The invention will be further described with reference to the accompanying drawing wherein the sole FIGURE represents schematically a method and system for carrying out the separation of mixtures of the metals in aqueous solution.

DESCRIPTION OF PREFERRED EMBODIMENTS

The Extracting Agent

The dialkanoylmethane employed as extracting agent contains two α-alkyl or α,α-dialkylalkanoyl groups each very suitably containing from four to about 10 carbon atoms, preferably from four to seven carbon atoms, inclusively. Examples of α-branched alkanoyl groups which are suitably independently incorporated in the extracting agents include the α-branched acyclic alkanoyls such as isobutyryl, pivaloyl, α-methyl-butyryl, α,α-dimethylbutryl, α-methyl-α-ethylbutyryl, α-methylhexanoyl, and α-ethylvaleryl and the α-branched alicyclic alkanoyls such as hexahydrobenzoyl and cyclopentanecarboxyloyl. Dipivaloylmethane, pivaloyl-α,α-dimethylbutyrylmethane and pivaloyl-α-methylhexanoylmethane are preferred extracting agents, with dipivaloylmethane being most preferred.

The dialkanoylmethane extracting agent is employed as a non-aqueous solution. As solvent for this solution is employed materials which are liquid at ambient conditions, which will dissolve at least about 0.1 gram equivalent weights (gew/l) of dialkanoylmethane per liter and which are only sparingly soluble in water. Organic solvents are very suitable. Hydrocarbon solvents are preferred. Hydrocarbons which may be very suitably employed include non-acetylenic aromatic and saturated or olefinic aliphatic or cycloaliphatic materials such as, for example, benzene, toluene, the xylenes and aromatic fractions containing the same and octane, decane, hexane, methylcyclohexane and predominantly saturated aliphatic hydrocarbon fractions such as kerosene. Mixtures of solvents may be used and minor proportions of inert non-hydrocarbon organics such as substantially water-insoluble aliphatic ketones and alcohols, amines, amine oxides and phosphine oxides may suitably be incorporated into the preferred hydrocarbon solvent. Inert, water-insoluble oxygen or nitrogen-containing organic solvents may be employed. When copper values are being extracted the concentration of dialkanoylmethane extractant in the solution is suitably from about 0.1 gew/l to about 4 gew/l, and preferably from about 0.1 to 2 gew/l and most preferably from 0.25 − 1 gew/l. Lower concentrations may be employed but necessitate the use of excessive volumes of extracting solution.

When cobalt values are being extracted, it is suitable to employ solutions of extracting agent containing at least about 0.5 gew/l of dialkanoylmethane, extracting solutions containing from about 1.0 to about 4.0 gew/l of dialkanoylmethane are preferred with concentrations of from about 1.5 gew/l to about 3.0 gew/l being most preferred. By controlling the extracting agent concentration copper and cobalt may be separately sequentially extracted from an aqueous solution.

The Aqueous Feedstock

The aqueous phase from which the copper and/or cobalt values are selectively extracted contains an addition ammonium ions and sufficient alkali such as alkali metal and alkaline earth metal hydroxides or ammonia to render the solution alkaline. Aqueous leach solutions resulting from ammoniacal leaching of copper and cobalt-bearing ores are examples of suitable aqueous feedstocks. The invention especially advantageously extracts copper and cobalt from aqueous solutions containing at least about 0.2 gew/l of ammonium ions and having a pH of from about 7.5 − 9.0, preferably 8.0 − 9.0.

The process of the invention is particularly applied to the selective extraction of copper II (cupric) values and cobalt II (cobaltous) values from alkaline ammonium-containing solution also containing other metal values, such as sodium I, nickel II, manganese III, magnesium II, and zinc II. The relative amounts of copper and cobalt values and other metal values is not critical. The process of the invention can be applied to the less difficult separation of copper and/or cobalt values from alkaline solutions not containing excess ammonium salts.

The extraction is conducted by contacting the solution of dialkanoylmethane and the alkaline, ammonium ion-containing aqueous feed, in a batch-type or in a continuous process. In the latter modification, a several-stage continuous countercurrent extraction is preferred. In any modification, agitation is provided during the process to insure adequate (intimate) phase contact. This agitation, frequently in the form of vigorous stirring, is usually continued until equilibrium between the phases is established, generally a period of several minutes. Any emulsion which may form is broken, if required, in conventional manner by adding demulsifying agents such as alcohols. Troublesome emulsions are not frequently encountered, however, and the extraction proceeds smoothly, as a rule, at ambient or any other convenient temperature at which the aqueous feed and the extracting agent are liquid. Following contacting, the two phases are separated.

If desired, the extracted copper values are separated from the organic extract as by treatment of the separated organic phase with water or dilute mineral acid, whereupon the copper values return to an aqueous phase. The organic phase containing the extracting agent is suitably recycled whereas the copper values and/or cobalt are recovered from the aqueous phase by suitable means.

The other metal values such as nickel values remaining in the aqueous raffinate subsequent to extraction with the dialkanoylmethane extracting agent are recovered, if desired, by other selective extractions involving other extracting agents or by direct precipitation, such as with hydrogen. Some typical ammoniacal leach solutions which are very suitable include solutions containing copper, cobalt, and nickel such as are formed by ammonia leaching of pentlandite-containing ores, nickel and cobalt value containing solutions such as are formed by ammonia leaching of serpentinic laterite containing ores, and solutions containing copper and zinc value such as are formed by ammonia leaching of chalcopyrite containing ores.

Turning now to the drawing, application of the invention to the separation of copper, cobalt and nickel values from a typical ammoniacal leach solution is described. A liquid leach solution containing about 1% by weight of copper II value, 0.2 % by weight cobalt II value, 5% by weight of nickel II value, and 15% by weight of ammonium sulfate, and having a pH of about 9 is introduced via line 11 into an upper section of vertical rotating disc contactor 12, which defines a contacting zone and is provided with baffles and an axially positioned flat disc stirrer 14. An extractant solution of 0.5 gew/l of dipivaloylmethane in kerosene is introduced into a lower section of contactor 12 via line 15 and passes in counter-current through the leach solution. Contactor 12 functions as a mixer, intimately contacting the two liquids. The volume ratio of organic phase to aqueous phase is 1 : 1. An aqueous raffinate-rich product is removed via line 16 to phase separator 17 where residual kerosene extractant is separated and returned to contactor 12 via line 19. A rich extract stream is removed via line 20 to phase separator 21 where residual aqueous solution is separated and returned via line 22. A copper-fat first extract phase is removed from phase separator 21 via line 24 to mixer 25, where it is contacted with 1 normal $H_2SO_4$ supplied via line 27. This mixture is transferred through line 29 to phase separator 30 where an acidic aqueous solution of essentially copper sulfate is separated and removed via line 31. A now copper-poor kerosene-dipivaloyl-methane extractant phase is recycled via line 32. First raffinate, separated in phase separator 17 is introduced via line 34 to an upper section of rotating disc contactor 35. 0.1 Volume, per volume of aqueous phase, of a second extractant solution of 2.0 gew/l of dipivaloylmethane in kerosene is introduced via line 36 into a lower section of contactor 35 and passes in counter current through the aqueous phase. An aqueous raffinate-rich product is removed via line 37 to phase separator 39 where residual kerosene extraction is separated and removed to contactor 35 via line 40. A rich extract is removed via line 41 to phase separator 42 where the aqueous solution is separated and returned via line 44. A cobalt-fat second extract phase if removed from phase separator 42 through line 45 to mixer 46 where it is contacted with 2 normal HCl supplied via line 47. This mixture is transferred via line 50 to phase separator 51 where an aqueous solution of essentially cobalt chloride is separated and removed via line 52. A cobalt-poor dipivaloylmethane extract phase is recycled via line 54. A second raffinate separated in phase separator 39 containing nickel and very minor amounts of cobalt is removed via line 55. Nickel is separated from this raffinate by hydrogen reduction means (not shown) and residual cobalt is recycled to line 11.

EXAMPLE I

A series of 0.84 molar aqueous solutions of copper II (cupric sulfate) containing two moles/liter of ammonium ions were prepared. The pH's of the solutions were adjusted by the addition of ammonia. The solutions were shaken for 10–15 minutes at room temperature with benzene solutions of the dialkanoylmethane dipivaloylmethane (DPM). The aqueous phases were separated from the organic phases and the amount of copper extracted into the organic phases determined by a conventional iodide/thiosulfate titration. The results are given in Table I.

TABLE I

| pH | Normality of DPM in Benzene | DPM/Copper (II) in system | % m Copper (II) Extracted |
|---|---|---|---|
| 7.0 | 0.5 | 2.3 | 75 |
| 8.5 | 0.5 | 2.0 | 45 |
| 9.0 | 0.5 | 2.2 | 24 |
| 9.5 | 0.5 | 1.9 | 18 |
| 8.0 | 1.0 | 1.8 | 53 |
| 9.0 | 1.0 | 1.9 | 27 |

EXAMPLE II

A series of aqueous solutions containing varying smaller amounts of cupric sulfate and ammonium sulfate were prepared having pH's of 8.2. These aqueous solutions were shaken in a 60° C bath for from 10–15 minutes with a 0.8 normal benzene solution of dipivaloylmethane (DPM). The amount of organic phase employed in each test was selected to maintain a molar ratio of DPM to copper of 2.2 : 1. The organic phases were then separated from the aqueous phases and the amounts of copper extracted determined by titration. The results are given in Table II.

TABLE II

| Copper in Aqueous Feed, %w | Ammonium Sulfate in Aqueous Feed, %w | Copper Extracted from Aqueous, %m |
|---|---|---|
| 0.22 | 18 | 36.6 |
| 0.14 | 18 | 36.1 |
| 0.21 | 12 | 42.6 |

COMPARATIVE EXPERIMENT A

To demonstrate the serious hindrance of ammonium ions to extraction of metals a series of experiments similar to Examples I and II were conducted. No ammonium was present. The aqueous solution pH was greater than 10 in all experiments. The high extractions of copper observed in these experiments are shown in Table A.

TABLE A

| Normality of DPM in Benzene | DPM/Copper (II) in System | % m Copper (II) Extracted |
|---|---|---|
| 0.5 | 4 | 83 |
| 2.0 | 4 | 94 |
| 2.0 | 2 | 80 |
| 2.0 | 1 | 46 |

COMPARATIVE EXPERIMENT B

Dialkanoylmethanes extract negligible amounts of nickel from aqueous phases into organic phases. To demonstrate this, a series of experiments were conducted wherein alkaline, ammonium ion-containing aqueous solutions of nickel sulfate were shaken with benzene solutions of dipivaloylmethane. Contacting time, DPM concentration, aqueous solution pH, temperature and nickel concentration were all varied. Less than 1% of the nickel was extracted into the organic phase in any experiment as shown in Table B.

TABLE B

| Conc, nickel, percent w. | Conc. ammonium sulfate, percent w. | pH | Contact time, min. | Conc. DPM in benzene, nw. | [DPM]/[Ni] | Temp. °C. | Nickel extracted, percent nm. |
|---|---|---|---|---|---|---|---|
| 0.95 | 18 | 8.2 | 20 | 2.5 | 2.5 | 50 | <1 |
| 2.9 | 12 | 8.0 | 180 | 1.0 | 1.2 | 25 | <1 |
| 2.9 | 12 | 9.0 | 180 | 1.0 | 1.2 | 25 | <1 |
| 2.9 | 12 | 8.0 | 180 | 1.0 | 2.5 | 25 | <1 |

EXAMPLE III

Two aqueous solutions of cobalt (one pH 7, one pH 8) were prepared by raising the pH of a fresh acidic solution of cobalt sulfate by adding ammonia. This method was used to minimize formation of

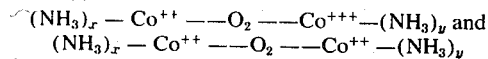
$(NH_3)_x - Co^{++} --O_2 --Co^{+++} -(NH_3)_y$ and
$(NH_3)_x - Co^{++} --O_2 --Co^{++} -(NH_3)_y$ species. ($x$ and $y$ usually equal 5) Two additional alkaline aqueous cobalt solutions were prepared and then air blown for one hour at 60° C to maximize formation of

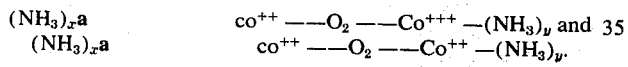
$(NH_3)_x a \quad Co^{++} --O_2 --Co^{+++} -(NH_3)_y$ and
$(NH_3)_x a \quad Co^{++} --O_2 --Co^{++} -(NH_3)_y$.

Ammonium sulfate was present in these four solutions. The solutions were then shaken with 0.5 n DPM in benzene and 0.5 n DPM in kerosene. Temperature was selected at either 25° C or 60° C. The organic phases were removed and the amount of cobalt extracted was determined by titration with EDTA. The results given in Table III show that at this DPM concentration there is negligible extraction of cobalt.

TABLE III

| Cobalt Concentration, % w | pH | Conc. Ammonium Sulfate, % w | DPM in organic phase | Cobalt Extracted % m |
|---|---|---|---|---|
| 1.0 (no air) | 7.0 | 12 | 0.5 n in kerosene | <1 |
| 1.0 (no air) | 7.0 | 18 | 0.5 n in benzene | <1 |
| 1.0 (no air) | 8.0 | 12 | 0.5 n in kerosene | <1 |
| 1.0 (no air) | 8.0 | 18 | 0.5 n in benzene | <1 |
| 1.0 (air blown) | 7.0 | 12 | 0.5 n in kerosene | <1 |
| 1.0 (air blown) | 7.0 | 18 | 0.5 n in benzene | <1 |
| 1.0 (air blown) | 8.0 | 12 | 0.5 n in benzene | <1 |
| 1.0 (air blown) | 8.0 | 18 | 0.5 n in benzene | <1 |

EXAMPLE IV

Air-blown aqueous ammonium ion-containing cobalt solutions were extracted with 2.5 n DPM in benzene. At this DPM concentration, cobalt was extracted into the organic phase as shown in Table IV. The concentration of cobalt in the aqueous feed was 0.87 %w. The aqueous feed contained 12%w ammonium sulfate.

TABLE IV

| Ratio, [DPM]/[Co] | pH | Temp, °C. | %m of Cobalt Extracted into Organic Phase |
|---|---|---|---|
| 2.6 | 8.6 | 25 | 26 |
| 2.6 | 8.6 | 60 | 24 |
| 2.6 | 8.3 | 25 | 27.7 |
| 2.6 | 8.3 | 60 | 24 |
| 2.6 | 8.0 | 25 | 16 |
| 2.6 | 8.0 | 60 | 15 |

EXAMPLE V

An aqueous solution of copper and cobalt (and 18% weight ammonium sulfate) were prepared and shaken with benzene solutions of dipivaloylmethane. At low DPM concentrations (about 0.5 normal) the extraction into the aqueous phase is quite selective for copper, leaving the cobalt in the aqueous phase. Further treatment with a more concentrated DPM solution (2 normal) would extract the cobalt. The conditions and results of these experiments are given in Table V.

TABLE V

| Normality of DPM in benzene | Initial solution, percent | | DPM, Cu | pH | Percent m extracted | | Separation* factor (β) |
|---|---|---|---|---|---|---|---|
| | W Cu | W Co | | | Cu | Co | |
| 0.5 | 1.1 | 0.62 | 2.5 | 8.6 | 36 | 0.7 | 80 |
| ↓ | ↓ | ↓ | ↓ | 8.3 | 42 | 3 | 23 |
| ↓ | ↓ | ↓ | ↓ | 8.0 | 45 | 4.5 | 17.5 |
| ↓ | 1.3 | 0.62 | 4.0 | 8.0 | 64.7 | 11 | 14.8 |
| 0.8 | ↓ | ↓ | ↓ | 8.0 | 71.4 | 15.4 | 14.0 |

$$\beta = \frac{[Cu\ (organic)]\ [Co\ (aqueous)]}{[Co\ (organic)]\ [Cu\ (aqueous)]}$$

COMPARATIVE EXPERIMENT C

In screening experiments, aqueous solutions of magnesium and zinc were contacted with DPM in benzene. Less than 1% of either of these metals were extracted by the organic solution of dialkanoylmethane.

EXAMPLE VI

A series of alkaline (pH 8.2), ammonium ion-containing aqueous solutions of copper II and nickel II were prepared. These solutions were shaken at 60° C for 10–15 minutes with benzene solutions of two other examples of the preferred dialkanoylmethanes having alkanoyl groups of from four to seven carbons, pivaloyl α-methylpropionoylmethane (PPM) and pivaloyl α-methyl-butyroylmethane (PBM). These materials exhibited properties similar to those of DPM, that is they extracted negligible amounts of nickel and extracted major proportions of copper at both high and low diketone concentrations. The results and conditions of these experiments are given in Table VI.

EXAMPLE VII

An alkaline (pH 8.5), aqueous solution of copper II (1%) containing 12% by weight of ammonium sulfate was shaken with a 0.5n solution of DPM in 2-ethylhexanol, (mole ratio of extractant to metal, 2.5). Forty percent of the copper was extracted into the organic phase.

TABLE VI

| Metal and conc., percent, w. | Ammonium sulfate, percent, w. | Extractant and conc., n. | [Ext'nt]/[Metal] | Metal extracted percent, m. |
|---|---|---|---|---|
| NiII, 5.0 | 12 | PPM, 0.5 | 0.5 | 2.2 |
| NiII, 0.94 | 12 | PBM, 2.0 | 2.5 | 4.0 |
| NiII, 4.43 | 12 | PBM, 0.5 | 0.5 | 2.0 |
| NiII, 4.43 | 12 | PBM, 2.0 | 0.25 | 2.1 |
| NiII, 0.94 | 12 | PPM, 0.5 | 2.5 | 1.9 |
| CuII, 1.24 | 12 | PPM, 0.5 | 2.5 | 57 |
| CuII, 1.16 | 12 | PBM, 0.5 | 2.5 | 62 |
| CuII, 1.0 | 12 | PBM, 2.0 | 2.5 | 90+ |

1. The process of selectively extracting copper values from an aqueous solution having a pH of from about 7.5 to about 9 and additionally containing at least one other metal value of the group consisting of nickel, manganese, magnesium and zinc values and not less than about 0.01 gram equivalent weights per liter of ammonium ion by (1) intimately contacting the aqueous solution with a sparingly miscible organic phase of a hydrocarbon solution of from 0.1 gram equivalent weights per liter to about 2 gram equivalent weights per liter of a dialkanoylmethane, wherein each alkanoyl independently is α-branched and contains from four to about seven atoms, and (2) recovering an extract of the solution of the dialkanoylmethane enriched in said copper values from the residual aqueous solution which contains said at least one other metal value.

2. The process in accordance with claim 1 wherein the dialkanoylmethane is selected from the group consisting of di α-alkylalkanoylmethanes having alkanoyl groups which independently contain from four to seven carbon atoms and di α,α-dialkylalkanoyl methanes having alkanoyl groups which independently contain from four to seven carbon atoms.

3. The process in accordance with claim 2 wherein the other metal values include nickel values.

4. The process in accordance with claim 3 wherein the aqueous solution has a pH of from about 8 to 9 and the other metal values include cobalt values and wherein the hydrocarbon solution of dialkylmethane contains from about 0.25 gram equivalent weights per liter to about 1.0 gram equivalent weights per liter of dialkanoylmethane.

5. The process in accordance with claim 4 wherein the dialkanoylmethane is dipivaloylmethane.

6. The process in accordance with claim 2 wherein the aqueous solution has a pH of from 8 to 9 and the other metal values include zinc values and wherein the solution of dialkanoylmethane is in hydrocarbon and contains from about 0.25 gram equivalent weights per liter to about 1.0 gram equivalent weights per liter of dialkanoylmethane.

7. The process in accordance with claim 6 wherein the aqueous solution has a pH of from about 8 to 9 and wherein the dialkanoylmethane is dipivaloylmethane.

8. The process of selectively extracting cobalt values from an aqueous solution having a pH of from 8 to 9 also containing nickel values and not less than about 0.2 gram equivalent weights per liter of ammonium ion by (1) intimately contacting the aqueous solution with a hydrocarbon solution of dipivaloylmethane containing from about 1.0 gram equivalent weights per liter to about 4.0 gram equivalent weights per liter of dipivaloylmethane and (2) separating from the resulting phase mixture the dipivaloylmethane-containing extract enriched with said cobalt values.

9. The integrated process of selectively extracting copper values and cobalt values from an aqueous ammoniacal leach solution having a pH of from 7.5 to 9 and additionally containing nickel values and not less than about 0.2 gram equivalent weights per liter of ammonium ion which comprises (1) intimately contacting said aqueous leach solution with an organic phase consisting essentially of a hydrocarbon solution containing about 0.5 gram equivalent weights per liter of dipivaloylmethane, (2) separating from the resulting phase mixture the dipivaloylmethane containing first extract enriched in said copper values and an essentially copper-barren aqueous first raffinate, (3) thereafter intimately contacting said first raffinate with an organic phase consisting essentially of a hydrocarbon solution containing about 2 gram equivalent weights per liter of dipivaloylmethane and (4) separating the resulting phase mixture into a dipivaloylmethane-containing second extract enriched in said cobalt value and an essentially copper and cobalt-barren second aqueous raffinate containing said nickel values.

* * * * *